United States Patent [19]

Banks

[11] Patent Number: 5,009,776
[45] Date of Patent: * Apr. 23, 1991

[54] FILTER SYSTEM

[75] Inventor: James V. Banks, Brockton, Mass.

[73] Assignee: Control Fluidics, Inc., Greenwich, Conn.

[*] Notice: The portion of the term of this patent subsequent to Dec. 5, 2006 has been disclaimed.

[21] Appl. No.: 394,307

[22] Filed: Aug. 14, 1989

Related U.S. Application Data

[63] Continuation of Ser. No. 97,285, Sep. 11, 1987, abandoned, which is a continuation of Ser. No. 755,466, Jul. 16, 1985, abandoned.

[51] Int. Cl.$^5$ .............................................. B01D 24/46
[52] U.S. Cl. .................................... 210/108; 210/264; 210/265; 210/274; 210/277; 210/279; 210/286
[58] Field of Search ............... 210/102, 108, 142, 264, 210/265, 266, 268, 274, 275, 277, 278, 279, 284, 286, 791–795, 807; 55/233

[56] References Cited

U.S. PATENT DOCUMENTS

| | | | |
|---|---|---|---|
| 538,720 | 5/1895 | Allen | 210/264 |
| 2,632,566 | 3/1953 | Morrison et al. | 210/102 |
| 2,754,971 | 7/1956 | Lawlor | 210/264 |
| 2,785,123 | 3/1957 | Stroud | 210/274 |
| 3,122,594 | 2/1964 | Kielback | 55/233 |
| 3,312,348 | 4/1967 | Greenleaf, Jr. | 210/264 |
| 3,547,270 | 12/1970 | Kass | 210/264 |
| 3,725,263 | 4/1973 | Harris et al. | 210/807 |
| 4,420,403 | 12/1983 | Tufts | 210/807 |
| 4,427,555 | 1/1984 | Brown et al. | 210/805 |
| 4,446,027 | 5/1984 | Simmers | 210/795 |
| 4,885,083 | 12/1989 | Banks | 210/274 |

Primary Examiner—Stanley Silverman
Assistant Examiner—Cynthia L. Nessler
Attorney, Agent, or Firm—Robert T. Gammons; Robert F. O'Connell

[57] ABSTRACT

A filter system for achieving continuous filtering by the provision of three filter chambers disposed about a common vertical axis, each containing a filter bed comprised of buoyant particles through which the fluid to be filtered is passed in an upward direction and wherein provision is made for rehabbing the beds of particulate material as they become filled with solids, preferably in succession to enable continuous operation.

7 Claims, 5 Drawing Sheets

FILTER SYSTEM

This is a continuation of copending application(s) Ser. No. 07/097,285 filed on 09/11/87, now abandoned, which is a continuation of Ser. No. 755,466, filed 07/16/85, now abandoned.

BACKGROUND OF THE INVENTION

The filter system herein to be described constitutes an extension and an improvement upon the filter systems illustrated in U.S. Pat. Nos. 4,420,403 and 4,427,555, assigned to the assignee of the instant application in that it is compartmentized so as to enable successively rehabbing a selected compartment while the remaining compartments continue to function in their filtering capacity.

SUMMARY OF THE INVENTION

As herein illustrated, the filter system in one form comprises a vessel containing a plurality of compartments defined by dividers positioned about a common center wherein the compartments are isolated from each other at the top of the vessel and in communication with each other at the bottom of the vessel. There is means spaced downwardly from the top of the vessel and upwardly from the bottom of the vessel, defining with the top and bottom a discharge chamber at the top of each compartment, a settling chamber at the bottom of the vessel and filter chambers therebetween, one in each compartment. Filter media in the form of discrete filter bodies is provided in each of said filter chambers of such volume as to form a bed within the filter chamber corresponding in area to the cross section of the chamber and of a thickness less than the depth of the chamber. Desirably, the filter bodies are of a density such as to be held elevated at the top of the filter chamber by upward flow of fluid in the filter chamber. The discrete bodies are desirably buoyant in the fluid being filtered. However, it is to be understood that it is within the scope of the invention to employ discrete bodies corresponding substantially in density to the fluid being treated. There is conductor means for delivering fluid to be filtered into each filter chamber, conductor means for drawing off filtrate from the discharge chambers above the filter chambers; valve means associated with each of the aforesaid conductor means controlling the flow of fluid to the filter chambers and the discharge of fluid from the discharge chambers; collector means at the lower end of the vessel for retaining the solids gravitating to the lower end of the vessel; and means at the bottom of the vessel for drawing off the solids separated from the fluid. The means spaced downwardly from the top of the vessel comprise a plurality of spaced, parallel bars, the spaces between bars being less than the diameter of the discrete bodies, said bars being of generally triangular cross section disposed with their apices uppermost, and the means spaced upwardly from the bottom comprises a plurality of spaced, parallel bars, the spaces between being less than the diameter of the discrete bodies, said bars being of circular cross section. In the preferred form, the collector comprises a plurality of vertically-disposed, spaced, parallel bars extending downwardly from the lower ends of the dividers for entraining the solids gravitating to the bottom. The means at the bottom for drawing off solids is a conductor provided with a valve for controlling the flow of fluid from the lower end of the settling chamber. In the preferred form, there are conductor means for delivering air to the filter chambers, conductor means for delivering fluid to be filtered to the filter chambers, conductor means for delivering supplemental fluid to the filter chambers at a relatively high pressure and conductor means for delivering washing fluid to the discharge chambers. For rehabbing the filter chambers, the discharge valve of the filter chamber being rehabbed is closed, the valves for introducing high pressure fluid pressurized air and washing fluid are opened and the valve in the conductor at the lower end of the settling chamber is opened. The discharge valves of the remaining chambers remain open and the valves for introducing high pressure fluid, air and washing fluid remain closed. The high pressure fluid that is introduced to the chamber being rehabbed provides energy for solids disengagement from the media while supplying volumentric flow of fluid necessary to carry solids that are disengaged to the settling chamber for discharge out the filter's bottom. The pressure of the high pressure stream can be such that the increased vessel pressure resulting from introduction of high pressure fluid keeps the filtration removal rate substantially constant with the reduced filter area. Flow of the high pressure stream also compensates for increased flow of fluid out the filter's bottom during rehabbing a filter bed. When the filter chamber being rehabbed is sufficiently purged, the valves for introducing high pressure fluid, air and washing fluid is closed, the valve in the conductor at the lower end of the settling chamber is closed and the valve for discharging fluid in the discharge chamber is opened. Sequencing of the valves to effect the foregoing may be achieved mechanically or electrically in response to predetermined pressure drops within a filter chamber due to accumulation of solids in the filter bed which obstructs the flow of fluid therethrough.

In a modified form, the collector at the bottom of the vessel comprise a manifold common to the several filter compartments and a module at the lower end of each filter chamber in communication with the manifold. Each module comprises a plurality of vertically-disposed, spaced, parallel baffle plates for entraining the solids gravitating to the bottom. A conductor connected to the lower end of the manifold provides for both withdrawing fluid and solids from the manifold and for introducing fluid into the manifold to scavenge the baffle plates. In this form, the high pressure conductor is optional during rehabbing of a chamber selected for rehabbing, the remaining chambers continue to function in their normal filtering capacity.

In another form, the fluid to be filtered enters through a feed pipe at the top of the vessel. Divider plates are positioned about the feed pipe dividing the vessel into three compartments which extend from the top to near the bottom so that the compartments are substantially isolated from each other, a manifold connects the feed pipe to the respective compartments through which fluid to be filtered is delivered into the compartments, a filter bed is positioned in each compartment supported above the manifold, a discharge opening is provided at the top of each compartment through which fluid passing through the filter can be discharged and there is baffle means in each compartment below the manifold through which solids separated from the fluid can gravitate to the bottom of the vessel.

According to the preferred method of filtering employing the preferred system, the fluid to be filtered is delivered from a common source into a plurality of filter chambers through inlet openings therein, each chamber containing a bed of loosely-associated, particulate material confined therein, withdrawing the fluid from the chambers through the discharge openings after it passes through the filter beds therein and periodically purging each filter bed in turn while continuing to filter through the remaining filter chambers comprising blocking the discharge from one of said chambers while continuing to introduce fluid to all of the chambers, delivering air under pressure to said one chamber to disperse the bed therein, introducing wash water into the chamber above the bed and introducing high pressure fluid to displace fluid and solids from the chamber into the settling chamber for discharge out the filter's bottom. Optionally, wash water is introduced to the chamber below the bed. The rehabbing of said one chamber for a predetermined period is continued for a sufficient length of time to clear the bed, whereupon filtering is resumed through all the chambers by unblocking the discharge opening of the one chamber and aborting delivery of high pressure fluid, high pressure air and washing fluid to said chamber. Alternatively, the method of filtering comprises delivering fluid to be filtered from a common source into a plurality of filter chambers through inlet openings therein, each chamber containing a bed of loosely-associated, particulate material confined in the chamber, withdrawing the filtrate from the chambers through the discharge openings after it has passed through the filter beds, and periodically purging the filter bed in each chamber, in turn, while continuing to filter through the remaining chambers, comprising blocking the outlet of said one chamber, blocking the inlets of the remaining chambers, redirecting the flow of fluid from the source to said one chamber so that the entire volume of fluid enters said one chamber and withdrawing the fluid from the bottom and remaining chambers through the outlets by way of the filter beds therein, continuing the rehabbing of said one chamber for a predetermined period sufficient to clear the bed and then resuming filtering through all of the chambers by unblocking the discharge opening of said one chamber and unblocking the inlet openings to said other chambers.

The invention will now be described in greater detail with reference to the accompanying drawings, wherein.

Referring to the drawings, FIGS. 1 to 4, the filter system in the preferred form comprises a cylindrical vessel 10 within which there is a bed 12 of filter media through which fluid to be filtered passes in an upward direction and is discharged from the upper end and a settling chamber 14 at the lower end from which solids removed from the fluid are withdrawn.

Figure 1:
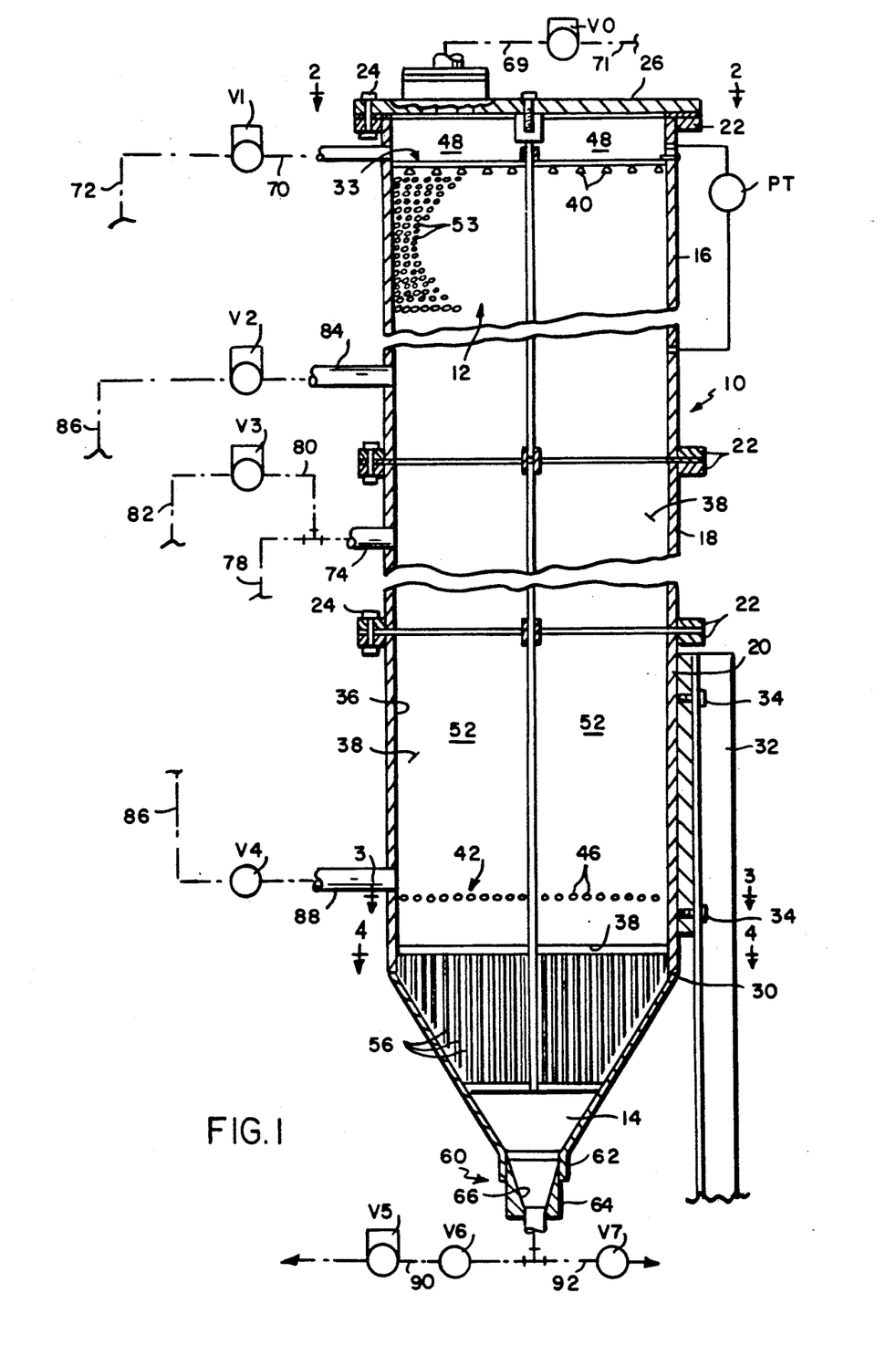
FIG. 1 is a vertical diametral section of the preferred form of the filter system of this invention showing the plumbing schematically.

More specifically, the vessel 10 as shown is comprised of three cylindrical sections 16, 18 and 20 provided with flanges 22 and bolts 24 by means of which they are connected to each other. At the upper end of the section 16, there is a flat cover plate 26 attached to flange 22 by bolts 24. The settling chamber 14 is frusto-conical in shape and is attached by welding 30 to the lower end of the section 20. The structure is supported by three legs 32 spaced at equal distances peripherally thereof and secured thereto by means of bolts 34.

Figure 3:
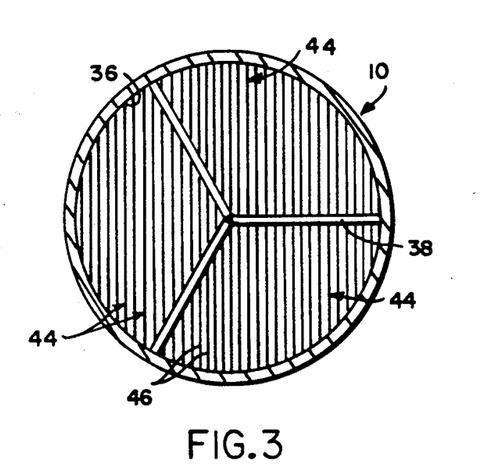
FIG. 3 is a transverse section taken on the line 3—3 of FIG. 1.
Figure 4:
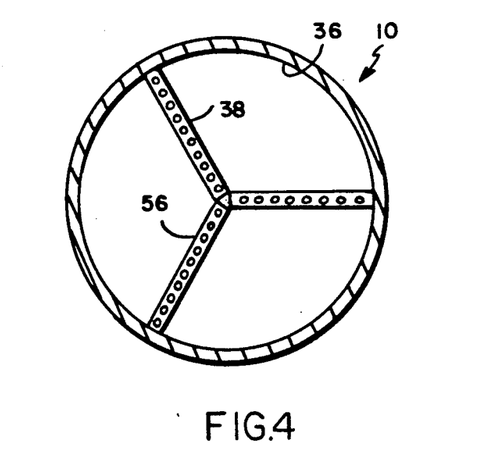
FIG. 4 is a transverse section taken on the line 4—4 of FIG. 1.

The interior of the vessel 10 is divided into three compartments 36, FIG. 3, of equal cross section positioned about the vertical center line of the vessel by radially-disposed divider plates 38, FIGS. 3 and 4, which extend from the underside of the cover plate 26 downwardly toward the settling chamber 14. The lower ends of the divider plates 38 terminate above the bottom of the settling chamber so that while the compartments 36 are isolated from each other throughout the major portion of the vessel from the cover plate 26 down to the settling chamber, the lower ends of the compartments 36 are in communication with each other at the lower ends of the plates 38.

Figure 2:
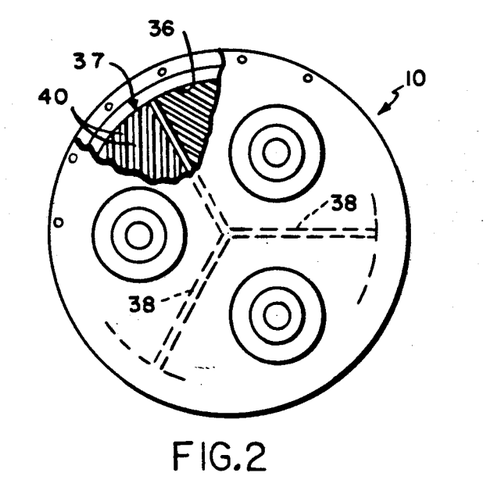
FIG. 2 is a plan view taken on the line 2—2 of FIG. 1 with a portion of the top broken away.

At the upper end of the vessel 10, FIG. 1, there is transverse structure 33 spaced downwardly from the cover plate 26 and parallel thereto comprising, FIG. 2, three arrays 37 of spaced, parallel bars 40, one array in each of the compartments 36. The bars 40 in each array, FIG. 1, are of triangular cross section and are disposed with their apices uppermost. The distance between parallel bars 40 is such as to prevent passage of the filter media therethrough, but large enough to permit free flow of fluid therethrough. At the lower end of the vessel, there is a transverse structure 42, FIGS. 1 and 3, comprising three arrays 44 of spaced, parallel bars 46. The bars 46 are of circular cross section and are spaced apart a distance which will prevent passage of the filter media therethrough, but will permit free passage of solids gravitating downwardly in the vessel. Bars of triangular cross section may be used in place of the bars of circular cross section positioned with their apices downwardly. The structures 33 and 42 divide the vessel into discharge chambers 48 at the top, a settling chamber 14 at the bottom and intermediate the two, filter chambers 52, three in number.

The filter chambers 52 contain filter media 12, FIG. 1, comprising a plurality of discrete filter bodies 53 shown herein as spherical in configuration which may be of the same or different size and which are comprised of a material which is of approximately the same density as the fluid filtered. It is to be understood, however, that it may be of slightly greater density or slightly lesser density. The bodies may be of regular or irregular surface configuration and may be comprised of plastic or metal and should be inert to the fluid being filtered. A sufficient volume of bodies is used to provide a bed coextensive in area with the cross section of each filter chamber and of a vertical depth such as to fill the upper portions of the chambers, that is, the portions above the place of entry of the fluids to be filtered into the chambers.

The beds of filter media are desirably approximately 8 to 20 inches thick and are comprised of a mixture of particulate bodies approximately 0.250 inches in diameter having a specific gravity of 0.900 and bodies approximately 0.100 to 0.200 inches in diameter having a specific gravity of 0.2 to 0.3. The bodies of the specific gravity of 0.900 constitute approximately 80% of the volume. Elastically deformable filter material may be used.

The structure just described is designed to effect removal of fibers from white water by passing the white water to be filtered upwardly through the filter bed 12 of the filter media wherein the fibers are stripped from the fluid and permitted to gravitate to the bottom where they are trapped temporarily in the settling chamber 14 until the filtering operation is completed, whereupon the solids are removed through the discharge opening 66. Vertically-disposed rods 56 extend from the lower end of the divider plates 38 into the settling chamber and provide for retaining the fibers at the bottom. Periodically, the filter bed 12 is rehabbed by dispersing the filter media 53 and precipitating the fibers loosened from the filter bed to the bottom. Desirably, to provide for a continuously operating system, one chamber at a time is purged, that is, subjected to stripping of the bed therein of fibers while the remaining chambers continue to function in their capacity as filters.

The plumbing for the filter system thus described as illustrated in FIG. 1 comprises a conductor 70 connected to each of the discharge chambers 48 in which there is a motor-operated valve V1 through which filtrate is discharged into a common header 72; a conductor 74 connected to each of the filter chambers 52 through which fluid to be filtered is delivered from a common header 78 into the chambers 52; a conductor 69 connected to each of the discharge chambers 48 in which there are solenoid-operated valves V0 through which wash water is delivered from a common header 71 into the discharge chambers 48; and conductors 80 containing solenoid-operated valves V3 through which air from a common header 82 is delivered into the treating chambers 52. In addition, there is a conductor 84 connected to each chamber 52 for introducing high pressure fluid into the chamber 52 above the inlet conductors 74, and a conductor 88 connected to each chamber 52 for introducing high pressure fluid into the chamber 52 above the structure 42. A motor-operated valve V2 connects the conductor 84 to a header 86 for high pressure fluid and a motor-operated valve V4 connects the conductor 88 to the header 86. At the lower end of the settling chamber, there are conductors 90 and 92, a motor-operated valve V5, and two shutoff valves V6 and V7.

During the filter mode, the valves V1 and V6 are open, the valves V0, V2, V3, V4 and V7 are closed. Flow is controlled by a motor-operated valve V5. The fluid to be filtered enters the filter chambers 52 through the conductors 74 to fill the entire vessel and when it flows upwardly through the filter beds 12, it is stripped of fibers, passes through the structures 33 into the discharge chambers 48 and out through the discharge valves V1 to the common header 72. The major portion of the fibers are entrained by the filter media. Such fibers as are not trapped by the filter media settle to the bottom of the chamber 14 where they are trapped in part by the rods 56 and in part settle into the bottom of the settling chamber 14. The rods 56 serve to maintain the fluids and solids in a relatively quiescent state.

In order to insure efficient filtering while maintaining continuous operation, the chambers 52 are periodically backwashed to rehab the filter beds 12 and this is generally done by backwashing the chambers successively, one after another.

For convenience in describing the operation, the chambers will be identified by the reference characters 52-1, 52-2, 52-3 and the valves for the respective chambers V0-1, V0-2, V0-3, V1-1, V1-2, V1-3, V2-1, V2-2, V2-3, V3-1, V3-2, V3-3, and V4-1, V4-2, V4-3.

For rehabbing the chamber 52-1, the valve V1-1 is closed, the valve V3-1 is open to admit air under pressure to the chamber 52-1 and the valve V2-1 is open to admit high pressure fluid to the chamber. By controlling the amount of air and the rate at which it passes through Valve V3-1, the displacement of the expanded bed can be controlled. The valves V1-2, and V1-3 remain open and the valves V2-2, V2-3, V3-2, V3-3 and V4-2, V4-3 remain closed. Fluids continue to be introduced into the chambers 52-1, 52-2 and 52-3. Closing the valve V1-1 prevents discharge from the chamber 52-1, opening the valve V3-1 permits high pressure air to enter the chamber 52-1 so as to disperse the bed 12 downwardly in the chamber and opening of the valve V2-1 delivers high pressure fluid to the chamber 52-1 so as to disperse the filter media within the chamber. The higher pressure developed by the introduction of the high pressure fluid propels the fluid downwardly in the chamber 52-1 and upwardly through the adjacent chambers 52-2 and 52-3 in sufficient volume and at a rate such as to compensate for the restriction in flow.

During rehabbing, the valve V0-1 is opened to deliver wash water into the discharge chamber 48-1 to clear the structure 33 of media and the valve V4-1 is opened to permit high pressure fluid to enter the chamber 52-1 just above the structure 42 to scavenge the upper surface of the bars 46. The valve V5 is opened during the rehab cycle and concentrated solids exit the filter through this valve. When open, the high pressure fluid introduced through the valve V2-1 is delivered in sufficient volume to maintain a substantially constant volume discharge from the vessel through the valves V1-2 and V1-3 to make up for the loss of fluid through the open valve V5. The valves V6 and V7 are shutoff valves.

When rehabbing has been completed, the valve V1-1 is opened and the valves V2-1, V3-1, V4-1 and V5 are closed.

The purging is carried out successively, one compartment at a time while the remaining compartments continue to be in operation, thus allowing filtering to continue without interruption so that a substantially constant flow of filtered fluid from the vessel is insured.

While the rehabbing can be initiated manually, it is desirable to an extend to automate operation; hence, there are provided pressure transducers PT, one for each chamber, connected to the chamber 52 below the bed therein and to the discharge chamber 48 above operable in response to a predetermined pressure drop to initiate rehabbing.

An alternative form of the filter system is shown in FIGS. 5 to 9 inclusive comprising a cylindrical vessel 100 within which there is a bed 120 of filter media through which fluid to be filtered passes in an upward direction and is discharged from the upper end and a settling chamber 140 at the lower end from which solids removed from the fluid are withdrawn.

Figure 5:
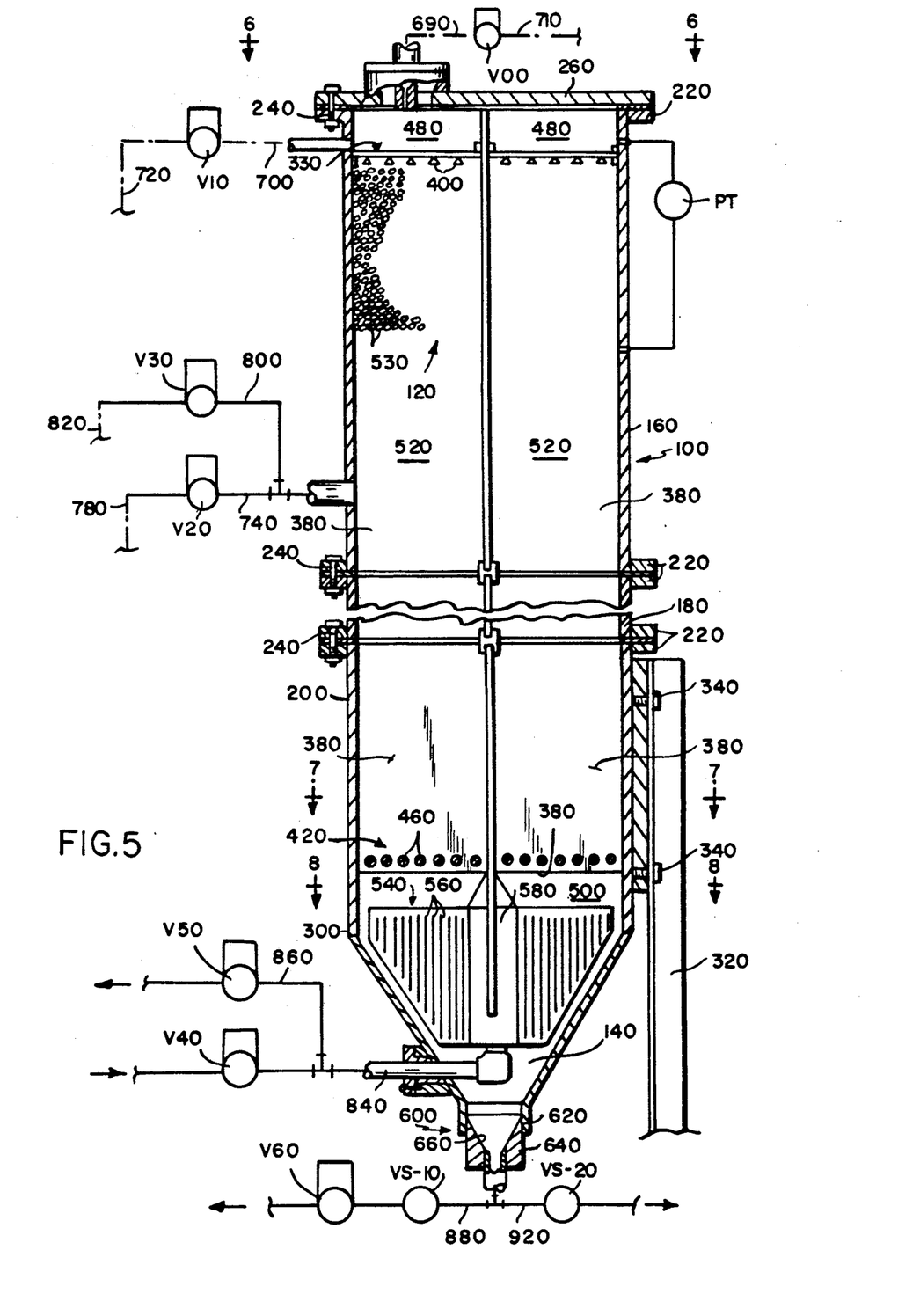
FIG. 5 is a vertical diametral section of a modified form of the filter system shown in FIG. 1.

The vessel 100 as shown is comprised of three cylindrical sections 160, 180 and 200 provided with flanges 220 and bolts 240 by means of which they are connected to each other. At the upper end of the section 160, there is a flat cover plate 260 attached to flanges 220 by bolts 240. The settling chamber 140 is frustoconical in shape and is attached by welding 300 to the lower end of the section 200. The structure is supported by three legs 320 spaced at equal distances peripherally thereof and secured thereto by means of bolts 340.

Figure 6:
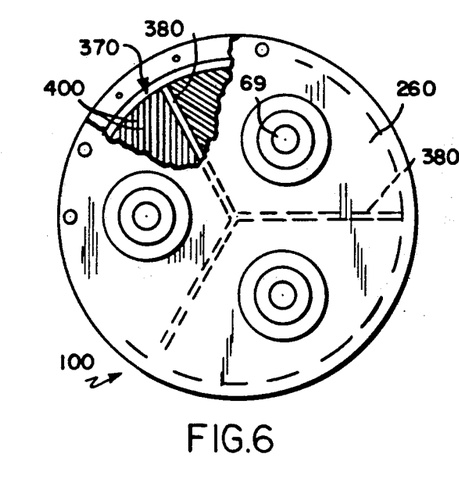
FIG. 6 is a plan view taken on the line 6—6 of FIG. 5 with a portion of the top broken away.
Figure 7:
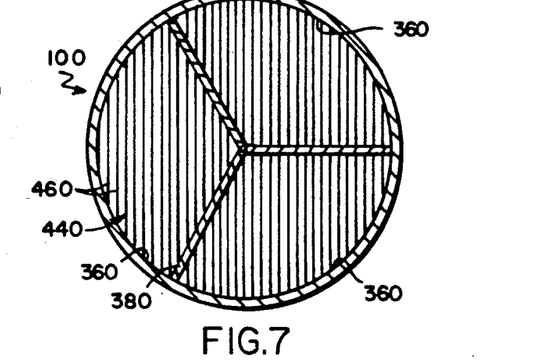
FIG. 7 is a transverse section taken on the line 7—7 of FIG. 5.
Figure 8:
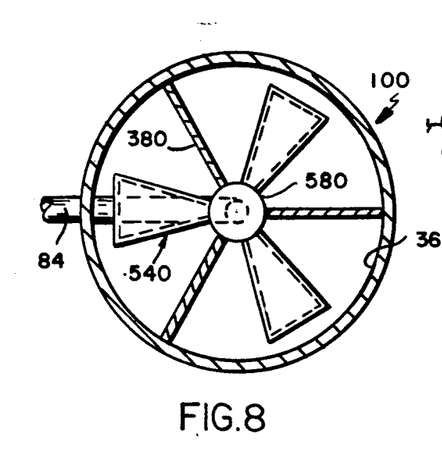
FIG. 8 is a transverse section taken on the line 8—8 of FIG. 5.

The interior of the vessel 100 is divided into three compartments 360, FIG. 7, of equal cross section positioned about the vertical center line of the vessel by radially-disposed divider plates 380, FIGS. 6 and 7, which extend from the underside of the cover plate 260 downwardly toward the conical settling chamber 140. The lower ends of the divider plates 380 terminate above the bottom of the settling chamber 140 so that while the compartments 360 are isolated from each other throughout the major portion of the vessel from the cover plate 260 down to the settling chamber 140, the lower ends of the compartments 360 are in communication with each other at the lower ends of the divider plates 380.

At the upper end of the vessel 100, FIG. 5, there is transverse structure 330 spaced downwardly from the cover plate 260 and parallel thereto comprising, FIG. 6, three arrays 370 of spaced, parallel bars 400, one array in each of the compartments 360. The bars 400 in each array, FIG. 5, are of triangular cross section and are disposed with their apices uppermost. The distance between parallel bars 400 is such as to prevent the passage of filter media therethrough, but large enough to permit free flow of fluid therethrough. At the lower end of the vessel, there is a transverse structure 420, FIGS. 5 and 7, comprising three arrays 440 of spaced, parallel bars 460. The bars 460 are of circular cross section and are spaced apart a distance which will prevent passage of the filter media therethrough, but will permit free passage of solids gravitating downwardly in the vessel. The structures 330 and 420 divide the vessel into discharge chambers 480 at the top, a settling chamber 140 at the bottom and intermediate the two, filter chambers 520, three in number.

The filter media 120, FIG. 5, comprises a plurality of discrete filter bodies 530 shown herein as spherical in configuration which may be of the same or different size and which are comprised of material which is of approximately the same density as the fluid filtered. It is to be understood, however, that it may be of slightly greater density or slightly lesser density. The bodies may be of regular or irregular surface configuration and may be comprised of plastic or metal and should be inert to the fluid being filtered. A sufficient volume of bodies is used to provide a bed coextensive in area with the cross section of each filter chamber and of a vertical depth such as to fill the upper portion of the chamber, that is, the portions above the place of entry of the fluid to be filtered into the chamber.

The desirable filter media for collecting fibers with size distribution ranging from 3 to 1 millimeters is a bed 8 to 20 inches thick and comprised of a mixture of particulate bodies approximately 0.20 inches in diameter having a specific gravity of 0.96 and bodies of approximately 0.10 to 0.015 inches in diameter having a specific gravity of 0.2 to 0.3 and wherein the bodies of the specific gravity of 0.96 constitute approximately 50% by volume. In general, a bed of filter media 12 inches deep of uniform size will extract 90% of all solids greater in diameter than one tenth the media diameter without the help of flocculants or other non-reusable filter aids.

At the lower end of the vessel below the structure 420, there are modules 540, one below each compartment 520, which extend into the settling chamber 140. Each module 540, FIG. 5, has vertically-disposed, spaced, parallel baffle plates 560 for trapping the solids gravitating into the settling chamber 140. The modules 540 are connected to a common manifold 580, FIGS. 5 and 8. At the lower end of the settling chamber 140, there is a discharge assembly 600 comprising a cylindrical sleeve 620 welded to the lower end of the settling chamber 140 and a coupling 640 defining a discharge opening 660 threaded into the sleeve.

The structure thus far described is designed to effect removal of solids from fluids by passing the fluids to be filtered upwardly through the bed 120 of the filter media, wherein the solids are stripped from the fluid and permitted to gravitate to the bottom where they are trapped temporarily in the settling chamber until the filtering operation is completed, whereupon the solids are removed through the discharge opening 660. Periodically, the filter bed 120 is rehabbed by dispersing the media 530 and precipitating the solids to the bottom. To provide for a continuously operating system, one chamber at a time is purged, that is, subjected to stripping of the bed therein of solids while the remaining chambers continue to function in their capacity as filters.

The plumbing for the filter system as thus described is illustrated in FIG. 5 and comprises a conductor 700 connected to each of the discharge chambers 480 in which there is a motor-operated valve V10 through which filtrate is discharged into a common header 720; a conductor 740 connected to each of the filter chambers 520 containing a motor-operated valve V20 through which fluid to be filtered is delivered from a common header 780 into the chamber 520; a conductor 690 connected to the discharge chamber 480 in which there is a solenoid-operated valve V00 through which wash water is delivered from a common header 710 into the discharge chamber 480; a conductor 800 containing a solenoid-operated valve V30 through which air from a common header 820 is delivered into the treating chamber 520; a conductor 880 connected to the coupling 640 containing a motor-operated valve V60; a shutoff valve VS-10 through which the concentrated solids can be withdrawn from the settling chamber; a conductor 920 connected to the coupling 640 containing a shutoff valve VS-20 providing access for cleanout; a conductor 840 connected to the lower end of the manifold 580 containing a motor-operated valve V40 through which backwash fluid can be introduced into the manifold 580; and a conductor 860 connected to the conductor 840 containing a motor-operated valve V50 through which cloudy filtrate can be removed.

During the filter mode, the valves V10, V20 and VS-10 are open, the valves V00, V30, V40, V50 and VS-20 are closed. Flow is controlled by a motor-operated valve V60. The valves VS-10 and VS-20 are optional since they are not involved in the normal filtering operation.

The fluid to be filtered enters the filter chambers 520, fills the entire vessel and flows upwardly through the filter beds 120 where it is stripped of solids and from thence through the structures 330 into the discharge chambers 480 and out through the discharge valves V10 to the common header 720. The major portion of the solids are entrained within the bed; however, some gravitates to the bottom where it is trapped in part by the baffle plates 560 and in part settle into the bottom of the settling chamber 140. The baffle plates 560 serve to maintain the fluid and solids in a relatively quiescent state.

In order to insure efficient filtering while maintaining continuous operation, the chambers 520 are periodically backwashed to rehab the filter beds and this is generally done by backwashing the chambers 520 successively one after another. For convenience in describing the operation, the chambers 520 will be identified by the reference characters 520-1, 520-2, 520-3 and the valves for the respective chambers V00-1, V00-2, V00-3, V10-1, V10-2, V10-3, V20-1, V20-2, V20-3 and V30-1, V30-2, V30-3.

Backwashing of the chamber 520-1 is effected by closing the valves V10-1 of the chamber 520-1 and the valves V20-2 and V20-3 of the chambers 520-2, 520-3, leaving the valves V10-2 and V10-3 open, opening the valves V00-1 and V50, leaving the valves V00-2 and V00-3 closed, and leaving the valves V40 and V60 closed. Valve VS-10 remains open while valve VS-20 is closed when they are included in the system. Thus, the entire volume of fluid being filtered together with the air enters through the open valves V20-1, V30-1 into the chamber 520-1. Since the valve V10-1 is closed, the air entering the chamber 520-1 through the valve V30-1 displaces the fluid in the chamber 520-1 downwardly, forcing it into the settling zone so as to collect solids in the baffle plates 560 as the fluid passes through the manifold 580 and through valve V50. Fluid also travels into the lower end of the chambers 520-2 and 520-3 and upwardly through the filter media therein so that filtering continues uninterruptedly. By controlling the air introduced into a chamber 520-1, the displacement of the bed can be controlled. The open valve V00-1 delivers wash water into the chamber 520-1 to strip the bars 400 and to wash the filter media while dispersed. The solids stripped from the filter media by displacement thereof and by the wash water gravitate to the bottom and are in part trapped by the baffle plates 560 and in part settle into the bottom of the settling chamber. The rehabbing operation continues for a sufficient length of time to rehab the bed 120 in the chamber 520-1, whereupon the valves V20-2 and V20-3 are successively opened, the valve V00-1 closed and the valve V10-1 opened so that normal filtering is resumed in the chambers 520-1, 520-2 and 520-3. Solids that are collected upon baffle plate 560 are then purged from the vessel as follows. Valve V50 in conductor 860 is closed and flow is reversed through manifold 580 by opening valve V40 which delivers high pressure fluid to the said manifold. Valve V60 at the bottom is then opened to remove the solids driven off baffle plates 560 by the reversal of flow through manifold 580. Upon clearing the baffle plates of solids, valve V40 is closed and valve V60 is successively closed at a predetermined interval. At suitable intervals, the chambers 520-2 and 520-3 are rehabbed.

Solids collect on the baffle plates 560 as fluid containing the solids pass through the plates 560, hence, the latter must be backwashed. To effect backwashing of the baffle plates 560, the valve V40 is opened and the valves V50 closed to permit high pressure fluid to pass through the conductor 840 and manifold 580. Cloudy fluid in the settling chamber 140 is withdrawn through the valve V50 which is opened for this purpose. In order to remove the concentrated solids at the bottom, the valves VS-10 and V60 are opened. For clean-out purposes, a conductor 920 and valve VS-20 are provided.

Suitable circuitry is provided to sequence the operation of the aforesaid valves to effect purging of the beds at intervals and for at times effecting removal of the solids. Mechanical or computer control means, including pressure transducers PT, can be used to program operation of the valves for both filling and flushing the system.

Figure 9:
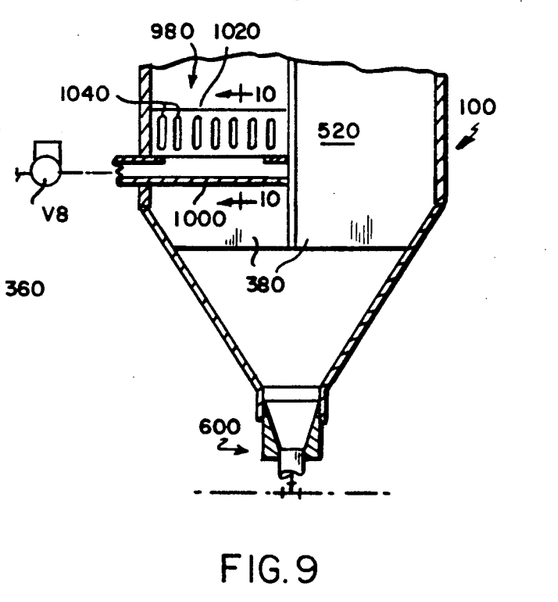
FIG. 9 is a fragmentary diametral section of a modified filter system.
Figure 10:
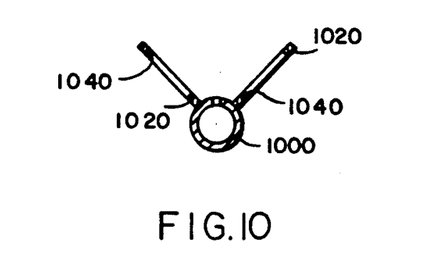
FIG. 10 is a section taken on the line 10—10 of FIG. 9.

A modification of the filter assembly described above is shown in FIGS. 9 and 10 wherein the structure 540 at the lower end of the vessel is replaced by a structure 980, FIG. 9, in each compartment 520. The structure 980 comprises a horizontally-disposed pipe 1000 to which are mounted two grid plates 1020—1020 at an angle to each other, FIG. 10. The grid plates contain elongate slots 1040 of a width which promotes solids disposition upon the plates. A pipe 1000 is slotted between the grids to facilitate removal of concentrated solids that collect on the plates 1020—1020. A shower, as shown in FIG. 1, but not shown in FIG. 9, is provided to dislodge the solids from the bed so that they gravitate to the grid plates 1020—1020. The pipe 1000 contains a motor-operated valve V8 for withdrawing concentrated solids. A discharge assembly 600 similar to that disclosed in FIG. 1 provides for removing solids gravitating to the bottom.

Figures 11, 12:
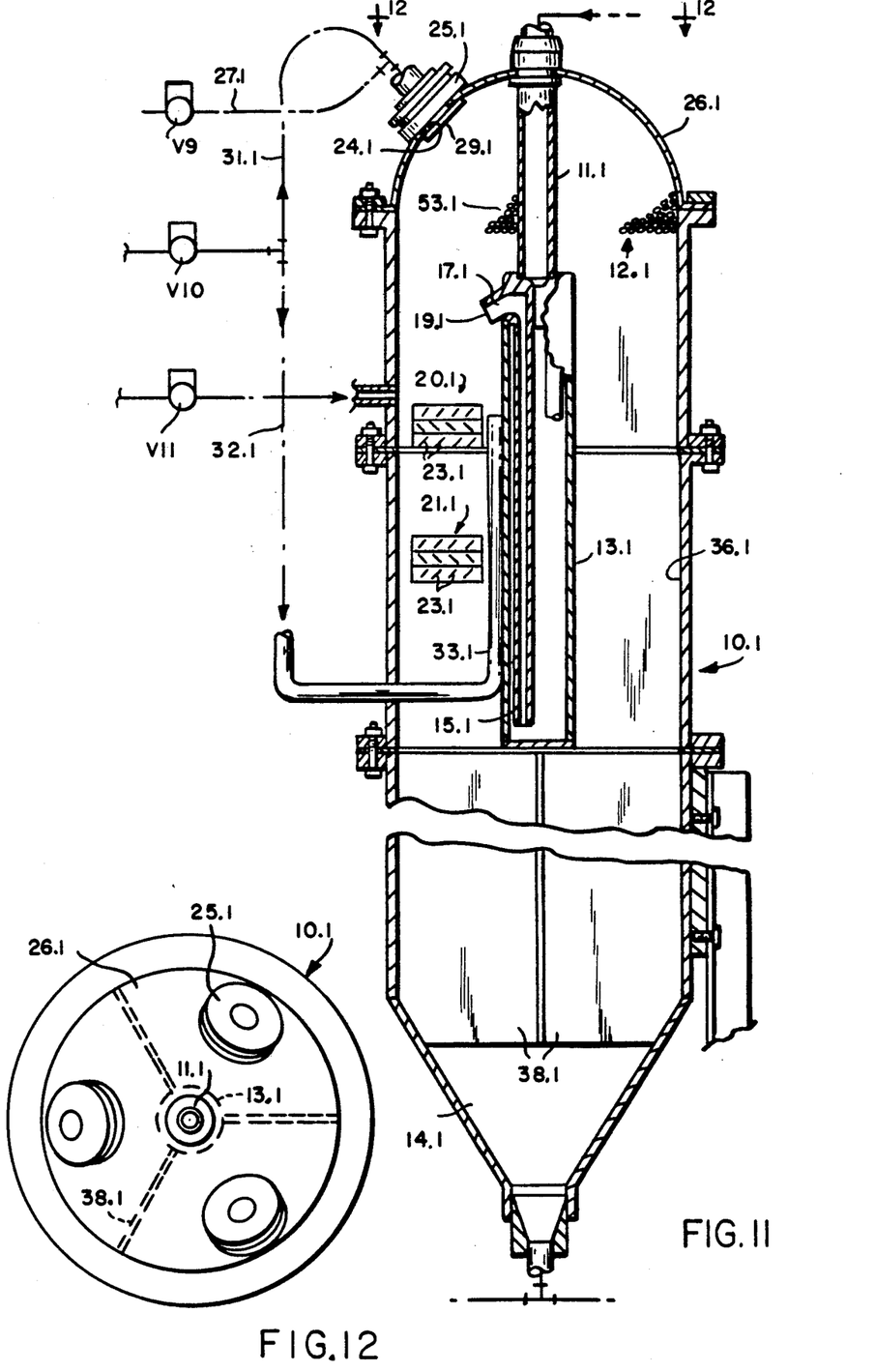
FIG. 11 is a vertical diametral section of another form of the filter system.
FIG. 12 is a plan view of FIG. 11 taken on the line 12—12 of FIG. 11.

Another form of filter assembly is shown in FIGS. 11 and 12 wherein the vessel 10.1 has a hemispherical dome-shaped top 26.1. Within the vessel, there is a vertical feed pipe 11.1 extending downwardly from the dome at the center into a distributor 13.1 which, in turn, extends downwardly within the vessel and is closed at its lower end. The interior of the vessel is divided peripherally of the feed pipe 11.1 and the distributor 13.1 into three compartments 36.1 of equal cross section by radially-disposed plates 38.1 which extend from the underside of the dome 26.1 down to the settling chamber 14.1 at the lower end of the vessel. The distributor 13.1 houses three distributor pipes 15.1 which extend from near the bottom upwardly therein to near the top where they are connected to openings 17.1 spaced around the distributor so as to open into each of the compartments 36.1. At each opening 17.1, there is a downwardly-inclined deflector hood 19.1. Two sets of three baffle plates 20.1 and 21.1 are positioned about the distributor in vertically-spaced, parallel relation. The baffle plates are spaced, parallel, oppositely-inclined vanes 23.1, the spaces between which are substantially greater than the dimensions of the filer media.

The filter media 12.1, like that described above, is comprised of discrete filter bodies 53.1 which are held at the upper end of the vessel within the dome by flotation and by upward flow of the fluid in the vessel. The lower sides of the beds are situated above the upper end of the distributors 13.1 and the baffle plates 20.1 and 21.1.

In operation, the fluid to be filtered is introduced through the feed pipe 11.1 and distributor pipes 15.1 into the compartments 36.1 and passes upwardly through the filter beds 12.1 therein. At the top of each compartment, there is a discharge opening 24.1 and a coupling 25.1 to which is connected a discharge conductor 27.1. A screen 29.1 covers each discharge opening 24.1 to prevent escape of the filter media. The screen 29.1 is comprised of bars of triangular cross section as are the bars 40 shown in FIG. 1. As thus constructed, the fluid to be filtered enters through the feed pipe 11.1 and leaves through the discharge conductors 27.1, each of which contains a motor-operated valve V9. In its passage, it packs the filter media within the dome 26.1 so that the solids are stripped from the fluid. The stripped solids gravitate through the baffle plates 20.1 and 21.1 to the bottom of the vessel where they collect in the settling chamber 14.1 at the bottom. Suitable valving, not shown, is provided for discharge of the fluids at the bottom.

To provide for continuous operation, it is necessary at times to purge the filter beds without disrupting continuous flow and at times remove solids from the settling chamber at the bottom. Specifically, each chamber 36.1 is purged by closing the motor-operated valve V9, opening the motor-operated valve V10 and opening the solenoid-controlled valve V11 of the chamber being purged. The valves V9 of the other two chambers are left open and the valves V10 and V11 are left closed. Wash water enters the chamber 36.1 through the valve V10 and conductors 31.1 and 32.1 and air enters through the valve V11 and displaces the bed downwardly. The solids gravitate to the bottom. Fluid entering the chamber 36.1 being rehabbed is forced downwardly to the lower end of the vessel and solids contained therein and are discharged in a similar manner to FIG. 1.

The purging is carried out successively one compartment at a time while the remaining compartments continue to be in operation, thus allowing filtering to continue without interruption. Suitable circuitry is provided to sequence the opening of the valves to effect purging at intervals and for at times effecting removal of the solids. As referred to above, mechanical or computer-controlled means may be employed to command the circuitry.

It should be understood that the present disclosure is for the purpose of illustration only and includes all modifications or improvements which fall within the scope of the appended claims.

What is claimed is:

1. Apparatus for removing by filtering particulate solids from a liquid, comprising a vessel, means dividing the vessel into three vertically-disposed filter chambers closed at the top and open at the bottom, means for delivering the liquid containing the solids to be filtered therefrom into each filter chamber, a first grid disposed in each filter chamber adjacent but spaced downwardly from the top defining, in conjunction with the top, a fluid discharge chamber at the top of each filter chamber, said first grid comprising spaced, parallel bars of triangular cross section disposed with their apices facing upwardly, a second grid disposed at the lower end of each filter chamber above the lower end of the vessel such as to define in conjunction with the lower end of the vessel a solids discharge chamber below the second grids common to the lower ends of said filter chambers, said second grids comprising spaced, parallel bars of circular cross section, a fluid discharge conductor connected to each of said fluid discharge chambers at the top above the first grid, each of said fluid conductors containing a fluid discharge valve, a solids discharge conductor connected to the lower end of the vessel below the second grids containing a solids discharge valve, an inlet conductor connected to each filter chamber through which the liquid containing solids therein to be filtered can be introduced into each filter chamber, each inlet conductor containing an inlet valve, a bed of buoyant, particulate filter material disposed in each filter chamber between the grids, said buoyant particulate filter material being of a size such as to inhibit the passage of said buoyant particulate material between the bars of the grids, hence, to maintain the bed intact, pressure-sensitive means for sensing the pressure differential of the fluid in said filter chambers above and below the upper grid bars, first means operable when the pressure differential in any one of the filter chambers reaches a predetermined level to close said fluid discharge valve in the discharge conductor of that chamber, and second means for introducing air pressure into the top of that chamber to displace the bed of buoyant particulate filter material downwardly therein to thus disperse the particulate filter material and, hence, to cause the solids contained in the liquid to gravitate to the bottom for a period sufficient to clear the bed of solids, said second means being operable when the pressure differential is restored to disable the means for introducing air at the top and reopening the liquid discharge valve.

2. Apparatus according to claim 1 comprising a conductor connected to each filter chamber and a valve associated with each conductor operable to introduce flush water to the filter chamber.

3. Apparatus according to claim 1 wherein there is collector means at the lower end of the vessel below the second grids for retaining the solids gravitated to the lower end of the vessel.

4. Apparatus according to claim 2 wherein there is means for delivering wash water onto the grid bars at the top while the bed is displaced downwardly.

5. Apparatus according to claim 2 wherein the collector means comprises a plurality of vertically-disposed, spaced, parallel baffle plates disposed about the center of the vessel.

6. Apparatus according to claim 3 wherein the collector comprises a manifold common to the several filter chambers and a module at the lower end of each filter chamber in communication with the manifold, each module comprising a plurality of vertically-disposed, spaced, parallel baffle plates for entraining the solids gravitated to the bottom of the vessel.

7. Apparatus according to claim 5 wherein there is a conductor for removing solids trapped in the baffle plates.

* * * * *